(12) United States Patent
Hu et al.

(10) Patent No.: US 10,293,947 B2
(45) Date of Patent: May 21, 2019

(54) AIRCRAFT HEATING SYSTEM

(75) Inventors: Jin Hu, Hudson, OH (US); James M. Roman, Uniontown, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 13/115,081

(22) Filed: May 24, 2011

(65) Prior Publication Data
US 2011/0290786 A1 Dec. 1, 2011

Related U.S. Application Data (60) Provisional application No. 61/349,167, filed on May 27, 2010.

(51) Int. Cl.
*B64D 15/12* (2006.01)
*B64D 33/02* (2006.01)

(52) U.S. Cl.
CPC ............ *B64D 15/12* (2013.01); *B64D 33/02* (2013.01); *B64D 2033/0233* (2013.01); *B64D 2033/0286* (2013.01)

(58) Field of Classification Search
CPC ............ B64D 15/12; B64D 2033/0233; B64D 2033/0286; B64D 33/02
USPC ....... 219/201, 543, 548, 552, 553, 202, 203, 219/219, 522, 520, 528; 392/432–436; 244/171.8
See application file for complete search history.

(56) References Cited

U.S. PATENT DOCUMENTS

| | | | |
|---|---|---|---|
| 2,741,692 A * | 4/1956 | Luke | 219/528 |
| 3,397,302 A * | 8/1968 | Hosford | 219/528 |
| 3,557,344 A | 1/1971 | De Crosta et al. | |
| 3,737,621 A | 6/1973 | Elkins | |
| 3,935,422 A | 1/1976 | Barnes et al. | |
| 4,942,078 A | 7/1990 | Newman et al. | |
| 4,972,197 A | 11/1990 | McCauley et al. | |
| 5,344,696 A | 9/1994 | Hastings et al. | |
| 5,824,996 A | 10/1998 | Kochman et al. | |
| 5,925,275 A * | 7/1999 | Lawson et al. | 219/543 |
| 5,971,323 A | 10/1999 | Rauch et al. | |
| 6,031,214 A | 2/2000 | Bost et al. | |
| 6,137,083 A * | 10/2000 | Bost et al. | 219/201 |
| 6,145,787 A | 11/2000 | Rolls | |

(Continued)

FOREIGN PATENT DOCUMENTS

| | | |
|---|---|---|
| EP | 1757519 A2 | 2/2007 |
| EP | 1826119 A2 | 8/2007 |

(Continued)

OTHER PUBLICATIONS

EPSR for EP Application No. 11250553.2, dated Aug. 20, 2014, 7 pages.

(Continued)

*Primary Examiner* — Mark H Paschall
(74) *Attorney, Agent, or Firm* — Cantor Colburn LLP (57) ABSTRACT

An aircraft heating system wherein the heater includes a haven (34) constructed from dielectric layers (40-50), conductive lanes (60), bus bars (70), and strips (80-150). Façade sections (41, 51, 61) of the dielectric layers (40-50) and the lanes (60) form the primary heating surface (31). The strips (80-150), along with sections (42, 52, 62) of the layers/lanes, form havens (34) for harbor sections (72) of the bus bars (70).

20 Claims, 14 Drawing Sheets

(56) References Cited

U.S. PATENT DOCUMENTS

| | | | |
|---|---|---|---|
| 6,194,685 B1 | 2/2001 | Rutherford | |
| 6,330,986 B1* | 12/2001 | Rutherford et al. | 244/134 E |
| 6,373,034 B1 | 4/2002 | Rock et al. | |
| 6,483,087 B2* | 11/2002 | Gardner et al. | 219/545 |
| 6,870,134 B2* | 3/2005 | Sol et al. | 219/203 |
| 7,078,658 B2 | 7/2006 | Brunner et al. | |
| 7,202,444 B2 | 4/2007 | Bulgajewski | |
| 7,291,815 B2 | 11/2007 | Hubert et al. | |
| 7,340,933 B2 | 3/2008 | Stewart | |
| 7,714,255 B2* | 5/2010 | Augustine et al. | 219/212 |
| 7,716,815 B2 | 5/2010 | Kim | |
| 7,786,408 B2 | 8/2010 | Augustine et al. | |
| 7,923,668 B2* | 4/2011 | Layland et al. | 219/535 |
| 2005/0109765 A1 | 5/2005 | Kondo et al. | |
| 2006/0278631 A1 | 12/2006 | Lee et al. | |
| 2007/0068923 A1 | 3/2007 | Augustine et al. | |
| 2007/0068929 A1 | 3/2007 | Augustine et al. | |
| 2007/0080155 A1 | 4/2007 | Augustine et al. | |
| 2008/0179448 A1 | 7/2008 | Layland et al. | |
| 2009/0309267 A1* | 12/2009 | Boot et al. | 264/496 |

FOREIGN PATENT DOCUMENTS

| | | |
|---|---|---|
| EP | 1845018 A2 | 10/2007 |
| WO | WO9809478 A1 | 3/1998 |

OTHER PUBLICATIONS

Office Action for CA Application No. 2,741,154, dated Jan. 24, 2017, 4 pages.
Office Action for EP Application No. 11250553.2, dated Feb. 16, 2016, 5 pages.

* cited by examiner

AIRCRAFT HEATING SYSTEM

RELATED APPLICATION

This application claims priority under 35 USC § 119(e) to U.S. Provisional Patent Application No. 61/349,167 filed May 27, 2010. The entire disclosure of this provisional application is hereby incorporated by reference.

BACKGROUND

An aircraft heating system can comprise an electrothermal heater that converts electrical energy into thermal energy (i.e., heat). Graphite fabric has recently shown great promise for functioning as the heating element in aircraft applications. Graphite heaters are lightweight, robust, provide a well-distributed heat pattern, and have a stable temperature coefficient. Moreover, such material is usually easily conformable to the three-dimensional shapes so commonly found on aircraft.

SUMMARY

An aircraft heating system is provided wherein the heater comprises bus-bar havens that are compatible with graphite-fabric heating lanes. The havens shelter vulnerable interfaces, mitigate cold spots on the primary heating surface, shield sensitive junctions, guard against adhesive migration during manufacture, offer electrical-connection redundancy, reinforce delamination-prone regions, fortify conductive seams, and/or address thermal stress concerns.

DESCRIPTION

Figure 1:
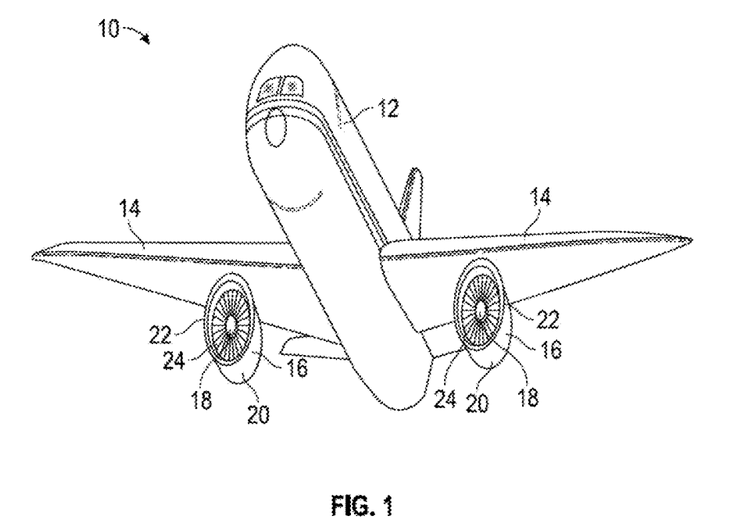
FIG. 1 is a view of an aircraft incorporating the heating system.

Referring now to the drawings, and initially to FIG. 1, an aircraft 10 is shown. The aircraft 10 comprises fuselage 12, wings 14, and engines 16. Each engine 16 comprises internal engine components 18 and a nacelle 20 which houses the internal engine components 18. Each nacelle 20 includes an inlet lip 22 which defines the inlet opening 24 through which air enters the engine 16.

Figure 2:
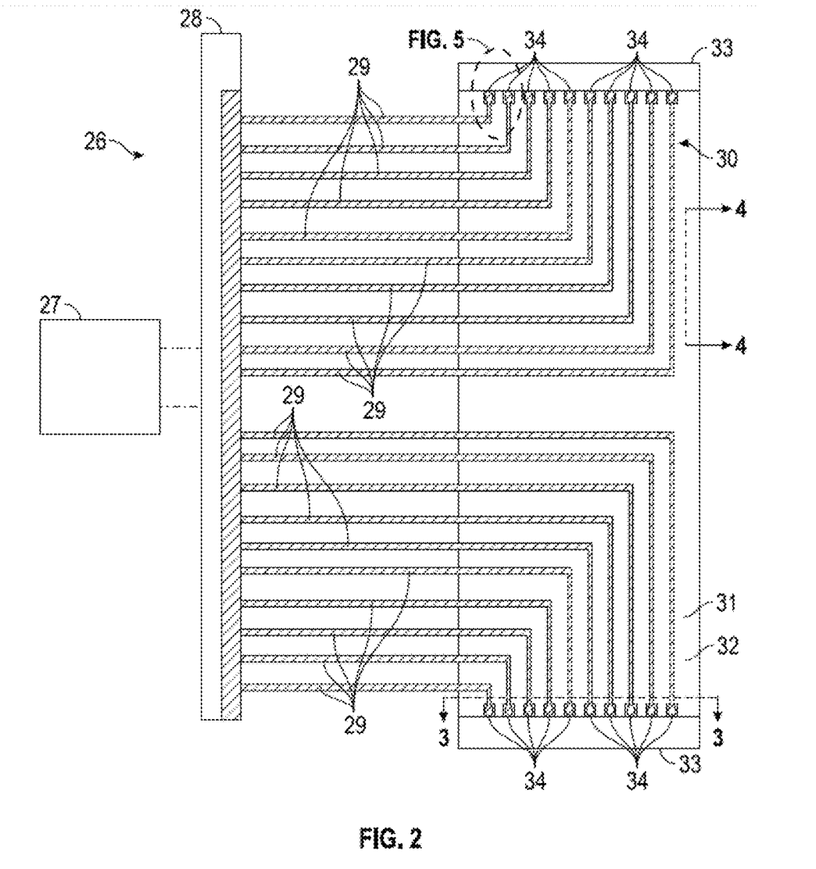
FIG. 2 is a schematic view of the heating system.

The nacelle 20, the inlet lip 22, and other areas of the aircraft 10 can be protected from ice accumulation during flight by the electrical heating system 26 shown in FIG. 2. The system 26 includes an electrical power source 27 which, in an aircraft application, could be an onboard generator. The source 27 provides power to a controller 28 which is connected, via electric conductors 29 to an electrothermal heater 30.

The heater 30 is drawn flat in FIG. 2 for ease in illustration. But it can instead have a roughly parabolic profile to match the geometry of the aircraft area being heated. If, for example, the heater 30 is intended to heat the engine's inlet lip 22, this contour allows it to bend therearound to cover both inner and outer regions. And if the heater 30 is intended to heat a wing 14, this geometry lends to curving around its leading edge to cover both upper and lower regions. Analogous arrangements could be used with the stabilizers, or any other aircraft area requiring heating. For larger aircraft areas (e.g., the nacelle lip 22 or the wings 14), a plurality of the heaters 30 can be arranged lateral-edge to lateral-edge to collectively service the entire ice-susceptible vicinity.

The heater 30 has an exterior surface 31 (covered in FIG. 2), an interior surface 32, lateral edges 33, and havens 34 along its lateral edges. The exterior surface 31 of the heater 30 typically faces outward and it can function as the primary heating surface. The interior surface 32 of the heater 30 faces inward and can be, for example, mounted to the relevant aircraft structure.

Figure 3:
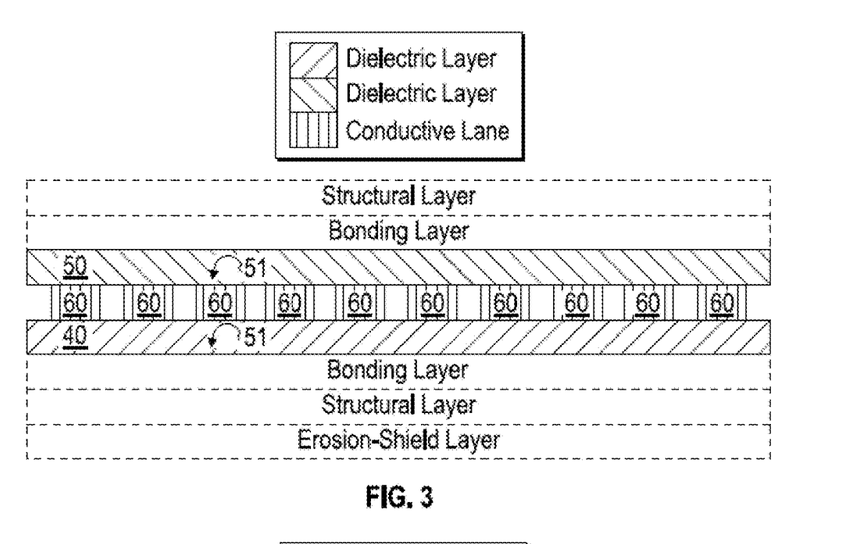
FIGS. 3 and 4 are sectional views as seen along the corresponding lines in FIG. 2.
Figure 4:
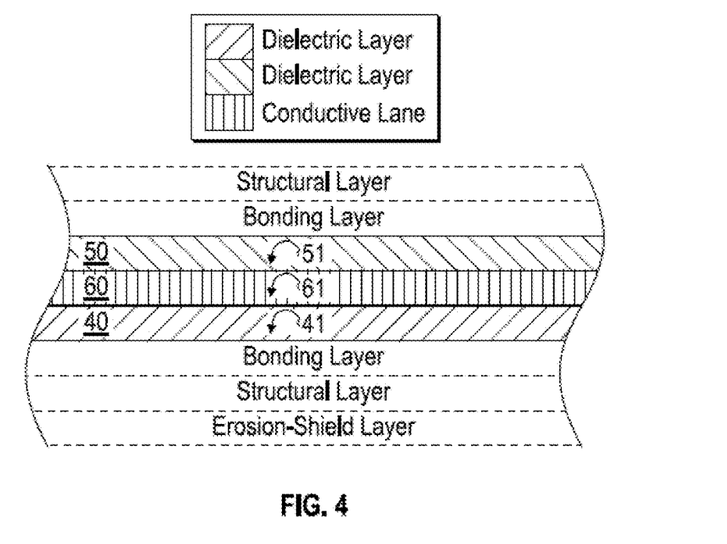

Referring now to FIGS. 3-4, the heater 30 comprises a dielectric layer 40 and a dielectric layer 50. The layers 40-50 can made be of one or more plies of electrically insulating glass cloth that are impregnated with a suitable curable resin. The heater 30 can include other layers adjacent its dielectric layer 40 and/or its dielectric layer 50 (e.g., a bonding, erosion-shield, and/or structural layers).

The heater 30 additionally comprises conductive lanes 60 sandwiched between the dielectric layers 40-50. The heater 30 can have one conductive lane 60, two conductive lanes 60, or more (e.g., at least three lanes, at least four lanes, at least six lanes, at least eight lanes, at least ten lanes, etc.).

The conductive lanes 60 are the heat-generating elements that convert electrical power into thermal power (i.e., heat). They each establish an electrical path between its lateral ends and affords ohmic generation of heat by dint of its electrical resistance. The lanes 60 can each comprise a resin-impregnated woven fabric that includes electrically-conductive fibers (e.g., carbon and/or graphite fibers). The lanes 60 can be distinct fabric strips spaced apart from each other and/or isolated from each other via inter-strip insulation.

The dielectric layer 40 includes a façade section 41, the dielectric layer 50 includes a façade section 51, and each conductive lane 60 includes a façade section 61. The façade sections 41/51/61 span the length of the heater 30 and form the primary heating surface 31. The layers 40-50 and/or the lanes 60 can each also include a haven portion 42/52/62 on the lateral ends of its façade section 41/51/61. The portions 42/52/62 contribute to the construction of the havens 34, as is explained in more detail below.

Although not specifically shown in the drawings, the layer 40, the layer 50, and/or the lanes 60 can include a plurality of aligned openings established to tailor electrical resistance and/or enhance noise attenuation.

Figure 5:
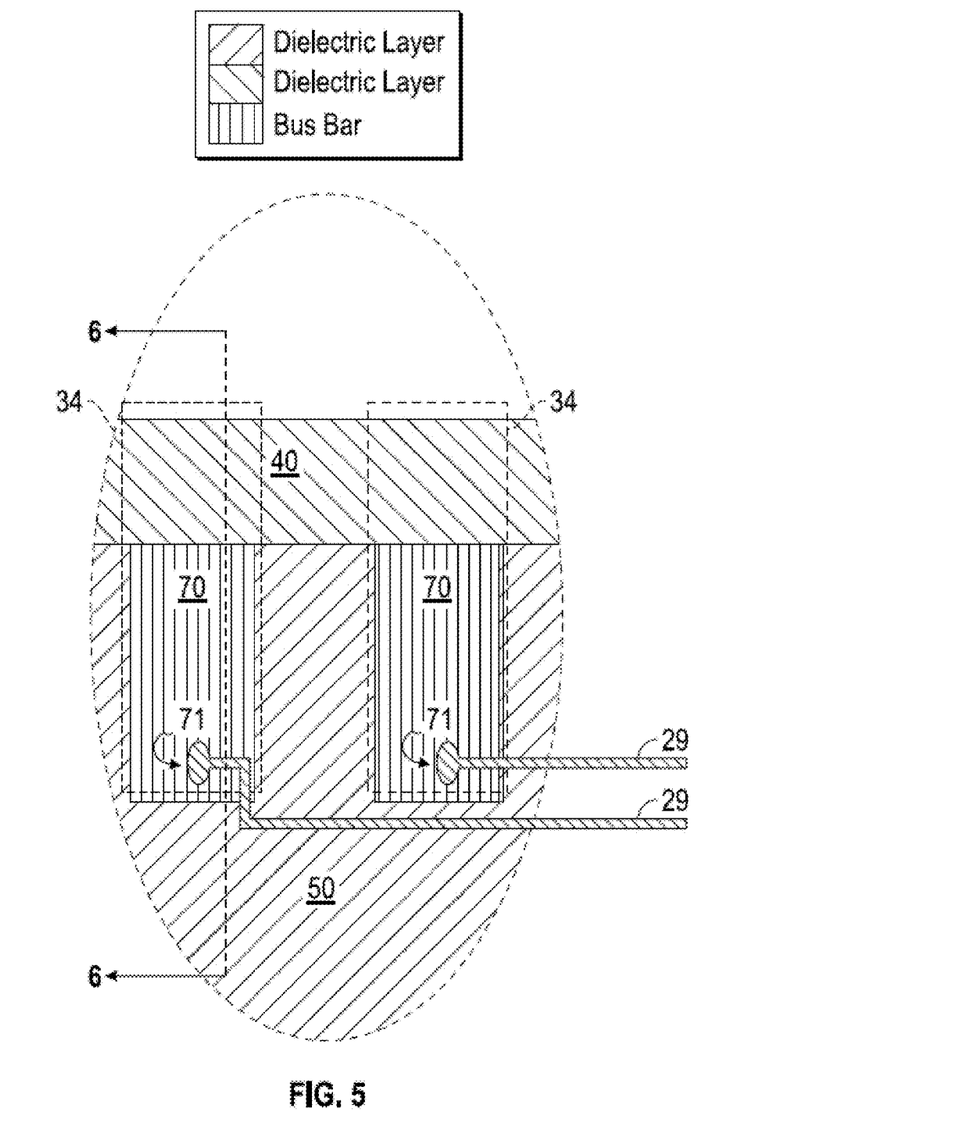
FIG. 5 is a close-up view of the corresponding circled area in FIG. 2.

Turning now to FIG. 5, the heater 30 also comprises bus bars 70 aligned along each lateral edge 33. As is best seen by referring briefly back to FIG. 2, a pair of bus bars 70 is provided per conductive lane 60, with one at each end of the electric path formed thereby. Each bus bar 70 has a section 71 adapted for electrical connection to the power source 27 (either directly or through a controller 28).

The bus-bar material should be electrically conductive and compatible with the electrical connection of the lines 29. For example, if the lines 29 are to be soldered to the bus bar 70, copper would be an appropriate material selection. If so (and in any event), the bus bar 70 can be a very thin plate (e.g., in the range or about 0.05 mm to about 0.13 mm thick).

Such thinness can help reduce thermal stress in the fabric-bus interface caused by temperature-expansion mismatches between graphite and copper.

Figure 6:
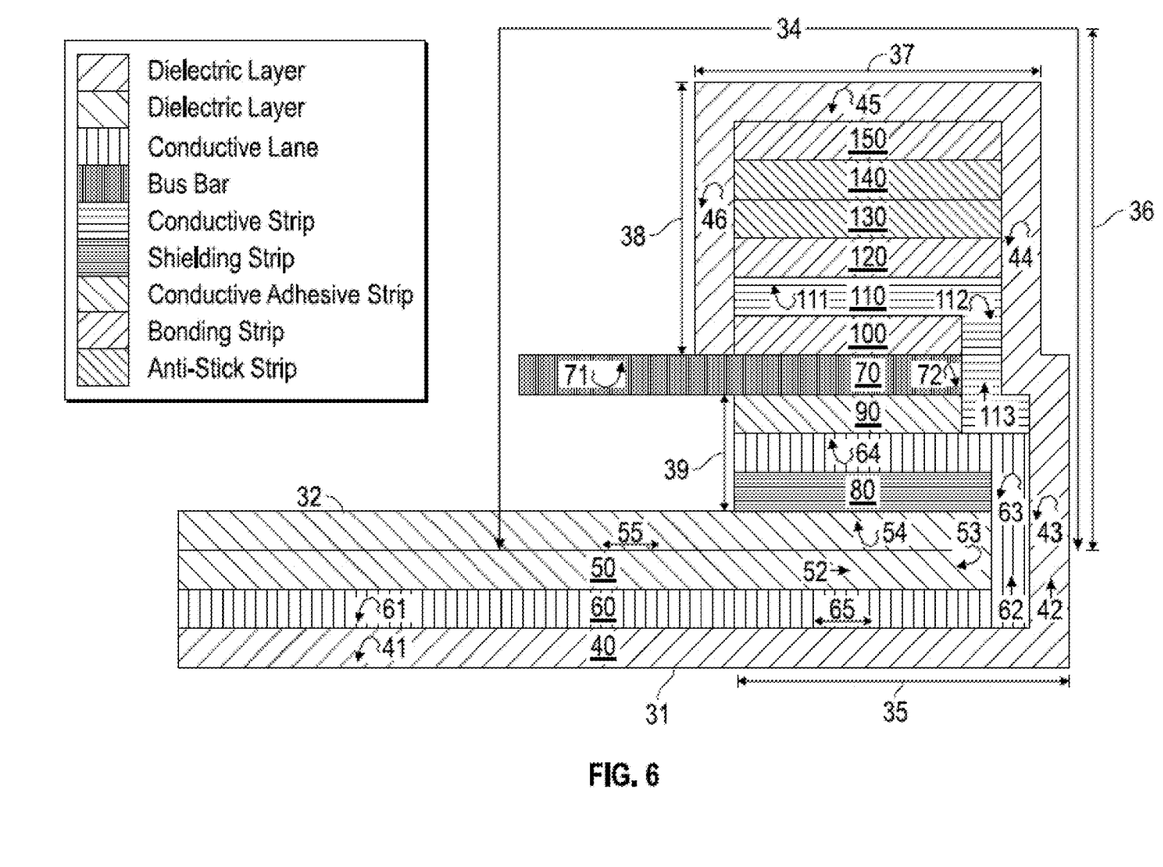
FIG. 6 is a sectional view as seen along the corresponding line in FIG. 5.

As is best seen by referring to FIG. 6, the heater 30 further comprises a set of strips 80-150 for each bus bar 70. The heater 30 can be made by compiling the layers 40-50, the conductive lanes 60, the bus bars 70, and the strips 80-150, and then curing this compilation to form a composite structure.

The haven 34 can be viewed as comprising a floor 35, a distal wall 36, a roof 37, an upper proximal wall 38 (above the bus-bar section 71) and a lower proximal wall 39 (below the bus-bar section 71).

The haven portion 42 of the dielectric layer 40 includes distal side sections 43-44 that form the haven's distal wall 36. This portion 42 also includes a ceiling section 45 that forms the haven's roof 37 and a proximal-side section 46 that forms the haven's upper proximal wall 38.

The haven portion 52 of the dielectric layer 50 includes a distal bend section 53, a ceiling section 54, and a tail section 55 extending therefrom. The tail section 55 projects outward and is positioned below the bus-bar section 71. This projection functions as an underpinning for bus-bar section 71 when the lines 29 are soldered or otherwise electrically connected thereto.

The haven portion 62 of the conductive lane 60 includes a distal bend section 63 and a ceiling section 64. The bend section 63 is located between the distal edge section 43 of the dielectric layer 40 and the bend section 53 of the dielectric layer 50. The ceiling section 64 is spaced above the façade section 61 to thereby form a pocket. The bend section 53 and the ceiling section 54 (but not the tail section 55) of the dielectric layer 50 are situated within this pocket.

As was indicated above, the bus bar 70 has a section 71 adapted for electrical connection to the power source 27 and this section planks beyond the haven's proximal walls 38 and 39. The bus bar 71 also has a section 72 harbored within the haven 34 and electrically connected to ceiling 64 of the conductive lane 60.

Accordingly, the lane's ceiling section 64 can serve only as an attachment platform for the bus bar 70. And bus bar 70 is not attached to the segment 65 of the lane's facade section 61 underlying the haven 34, whereby it can serve only as part of the primary heating surface 31. In this manner, cold spots on the segment 65 are mitigated as bus-bar attachment/insulation does not interfere with its heating function. Likewise, overheating is alleviated by the bus bar 70 not being surrounded by heating elements. This improves heat distribution patterns in the heater 30.

Additionally or alternatively, the bus-bar section 71 is distanced from the shelter provided by the dielectric layer 40 (e.g., its sections 44, 45, 46). Additionally or alternatively, it is disassociated from the (adhesive) strips 90 and 100. This remoteness can be beneficial when soldering or other techniques are performed to electrically connect the bus-bar section 71 to the power source 27. Specifically, for example, this seclusion can help minimize the thermal degradation of the underlying conductive adhesive and/or mechanical stress on the interface caused by such electrical-connection procedures.

The strip 80 comprises a dielectric polymer and the strip 90 comprises a conductive adhesive. The polymer strip 80 is located within the pocket formed by conductive lane 60. More specifically, the strip 80 is situated between the ceiling section 54 of the dielectric layer 50 and the ceiling section 64 of the conductive lane 60. The adhesive strip 90 is located on the lane's ceiling 64 whereby this conductive section 63 is sandwiched between the strips 80 and 90.

The strip 80 prevents migration of conductive adhesive from the strip 90 towards the façade section 61 of the conductive lane 60 during the manufacturing process. To this end, the strip 80 can be made of a polymer having good dielectric qualities and non-permeable with respect to the strip 80. Kapton™ is a strong contender for this cause, because of its good dielectric qualities, and its availability in thin sheets.

The strip 90 can be made of a conductive adhesive able to withstand high temperatures and can tolerate a wide temperature range during the course of a flight. Specifically, for example, the adhesive can be effective in temperatures ranging from −90° C. to 200° C. A suitable adhesive is a silver-filled high temperature-cryogenic epoxy adhesive available from Creative Materials (CMI 128-4A/B) or from Master Bond (Supreme 10 HT/S).

The strip 100 can be another adhesive strip located on the other face of the harbored section 72 of the bus bar 70. It can be made of the same or a similar material as adhesive strip 90 (i.e., electrically conductive, high temperature tolerance, and wide temperature range compatibility).

The strip 110 can comprise a ceiling section 111, a bend section 112, and a junction section 113. The ceiling section 111 is bonded (via adhesive strip 100) to the harbor section 72 of the bus bar 70 and thus electrically connected thereto. The bend section 112 is sandwiched between the distal section 43 of the dielectric layer 40 and the distal ends of bus bar 70 and the adhesive strips 90-100. The junction section 113 is secured to the ceiling section 64 of the conductive lane 60.

The strip 110 can be made of the same conductive fabric as the lanes 60 and is, in any event, electrically conductive. The strip 110 offers redundancy in the electrical connection between the bus bar 70 and the lane 60. If the lane's ceiling section 64 were somehow electrically isolated from the bus bar 70, a current path would still be provided by the strip 110.

Additionally or alternatively, the strip 110 serves as a shield for a delamination-prone district of the haven 34. Specifically, for example, its bend section 112 seals the distal ends of the adhesive-copper-adhesive interface of the bus bar 70 and the adhesive strips 90-100. This reinforcement is directed at the part of the haven 34 most vulnerable to stratum separation.

The strips 120-150 provide the haven 34 with a sliding decoupling between the bus bar 70 and the haven's walls 44, 45, 46. The strips 120 and 150 each comprise bonding adhesive and the strips 130 and 140 each comprise anti-stick film. The adhesive strip 120 bonds the anti-stick strip 130 to the strip 110 and the adhesive strip 150 bonds the anti-stick strip 140 to the haven's roof (i.e., the ceiling section 44 of the dielectric layer 40). The adhesive strips 120 and 150 can be any suitable adhesive (preferably non-conductive) that creates a suitable bond between the relevant surfaces.

The adjacent faces of the anti-stick strips 130 and 140 are not attached together, whereby they are free to slide relative to each other. This sliding interface affords some "give" allowing the bus bar 70 (e.g., copper) to shift during thermal expansion-contraction episodes and counter deformation stress. The strips 130 and 140 can be made, for example, of Kapton™, a high-temperature silicone rubber, or any other suitable "slippery" material.

Figure 7:
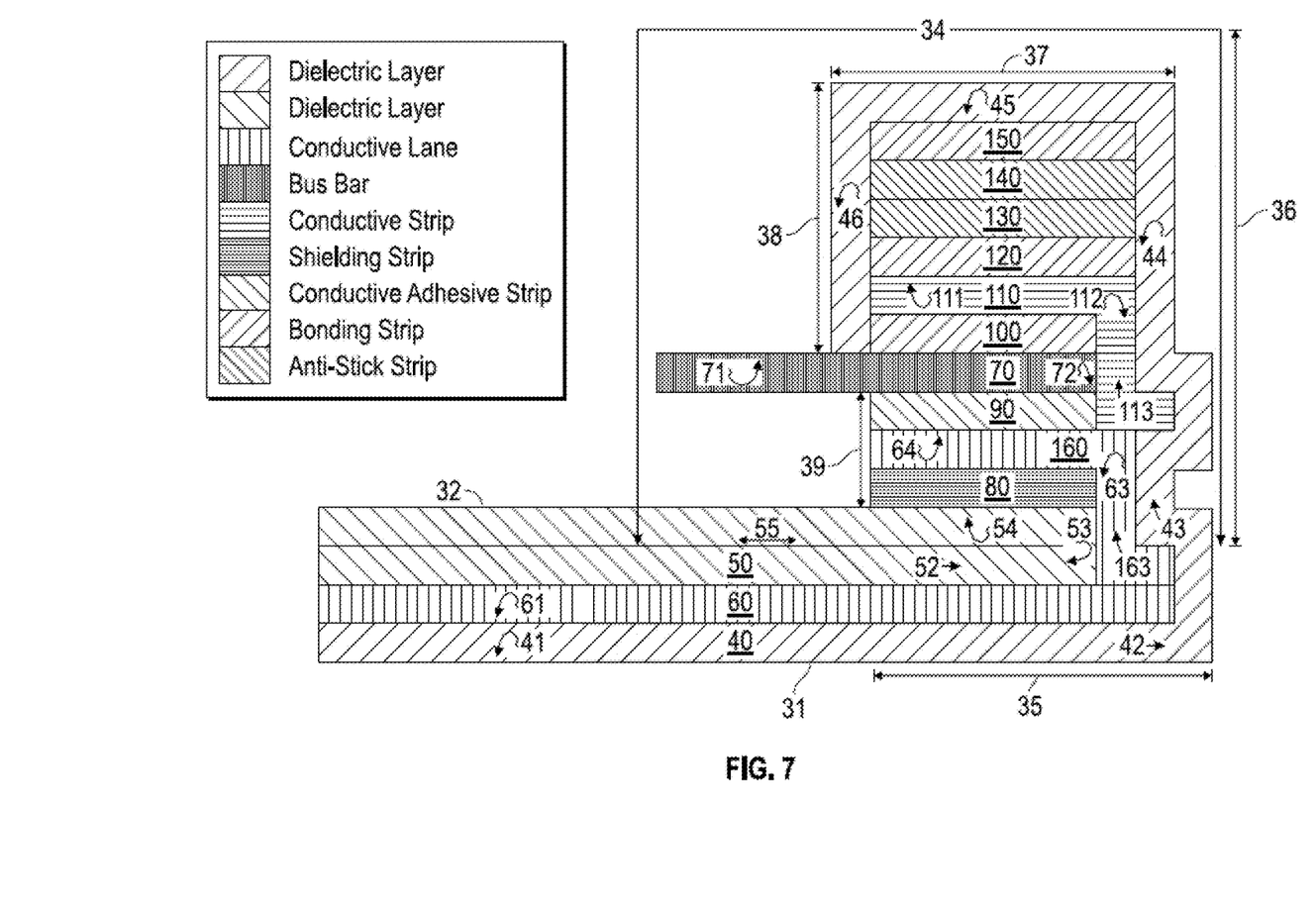
FIGS. 7-13 are views similar to FIG. 6, showing some modified haven constructions.

In a modified haven construction shown in FIG. 7, the sections 62 and 63 of the conductive lane 60 are provided by a separate strip 160. This two-piece construction may be preferred if the lane 60 and the dielectric layer 40 are perforated, to reduce the risk that an opening will fall on the bend 62 and create a line of weakness. The tail 163 of the strip 160 can be slightly larger than the sum of the perforations diameter and the inter-perforation gap. In this manner, an opening would not electrically disconnect the bend 62 and it would not be too large to cause a cold spot.

Figure 8:
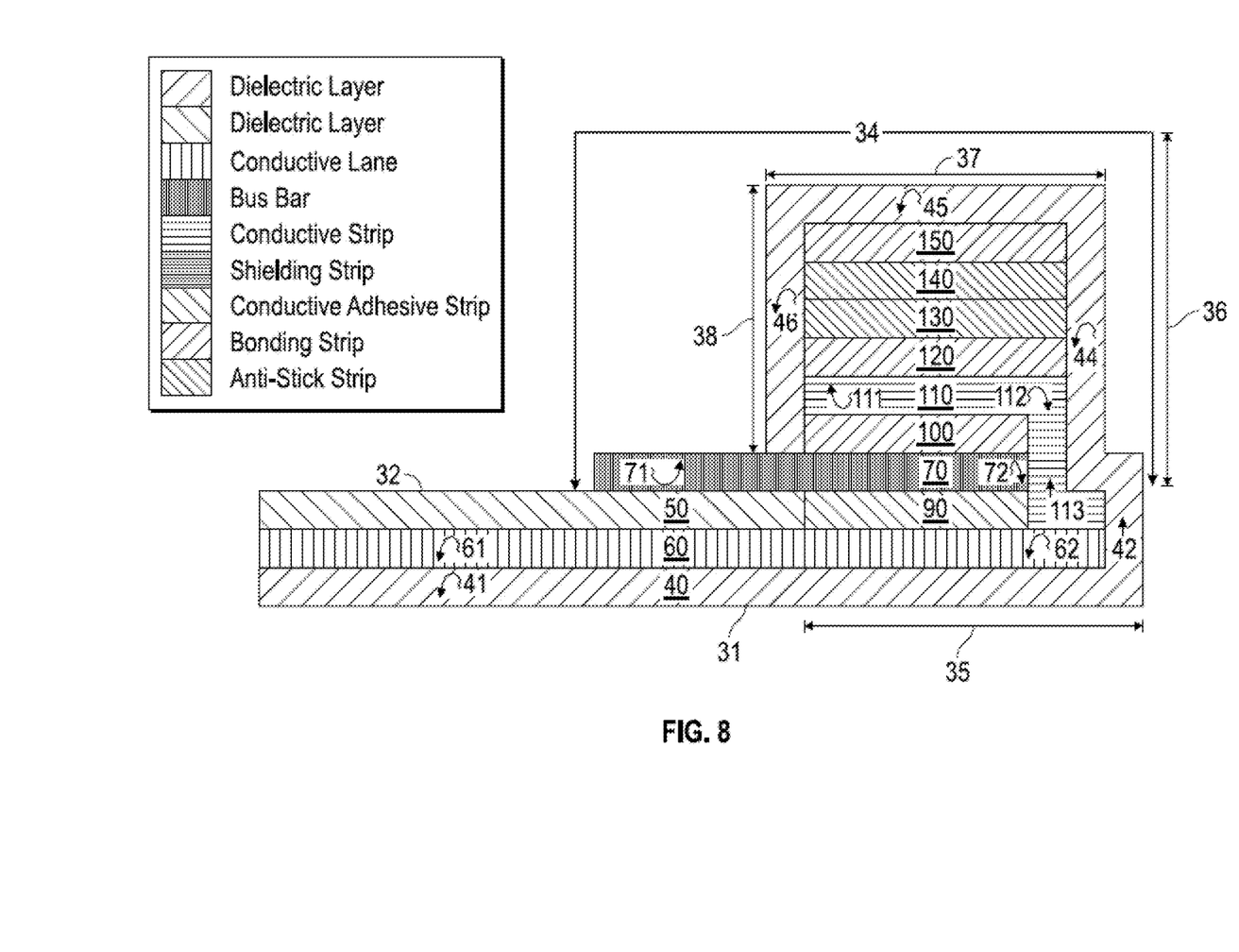
Figure 9:
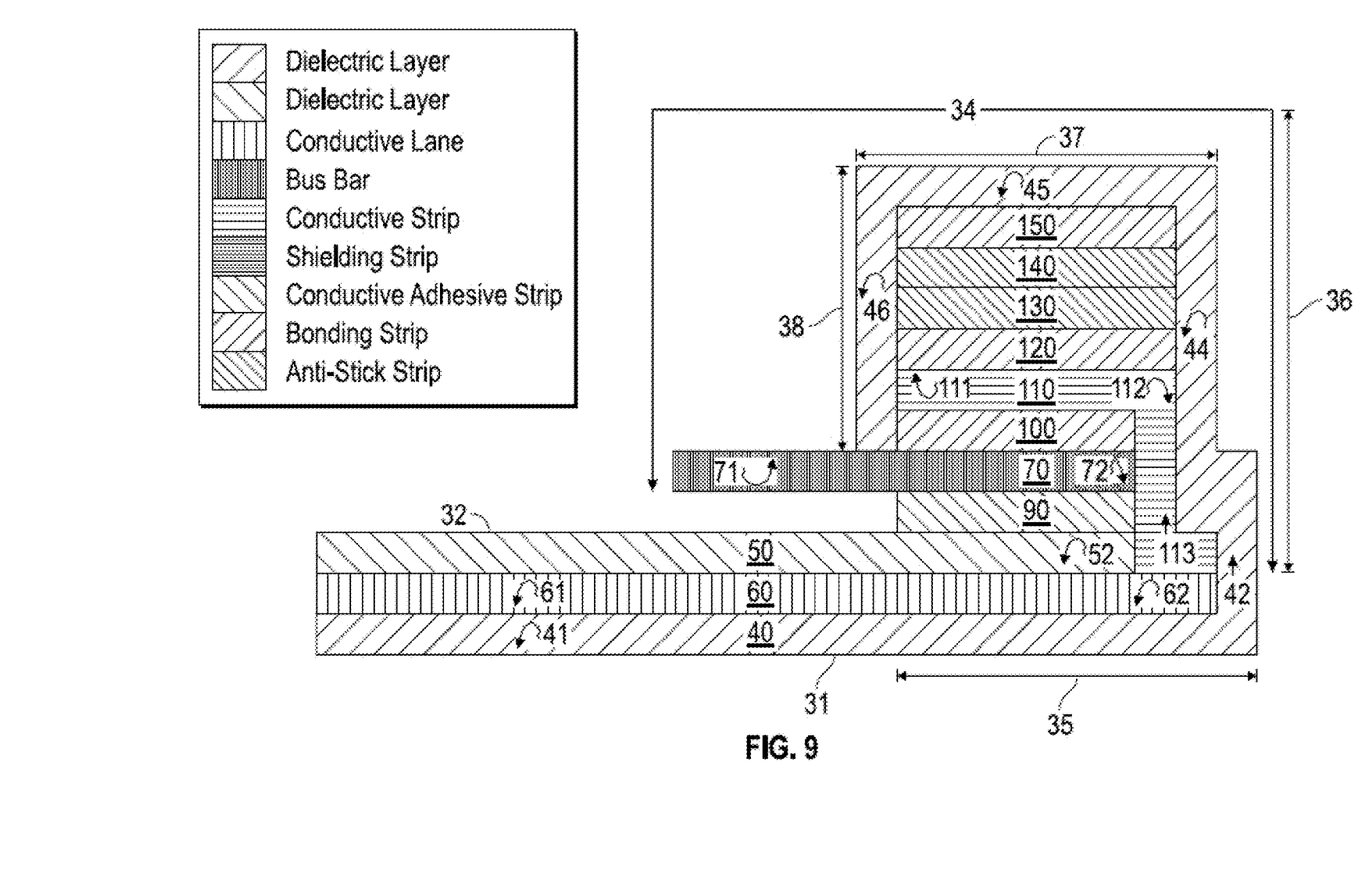
Figure 10:
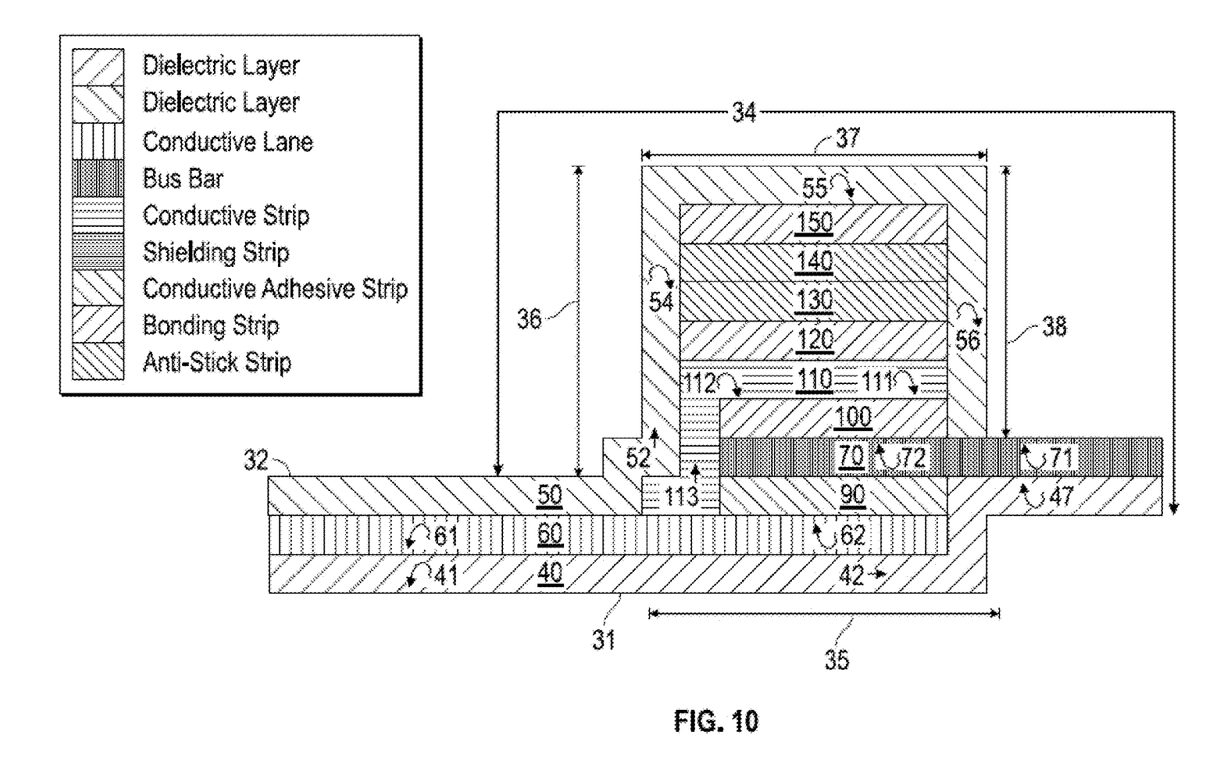

In the modified haven constructions shown in FIGS. 8-10, the haven portion 62 of the conductive lane 60 does not include a distal bend section 63 and/or does not include a ceiling section 64. This construction can be employed, for example, when it is not crucial to shield the bus bar 70 from heating elements. If the dielectric layer 40 is cured in a secondary operation (i.e., after the dielectric layer 50, the conductive lanes 60, and the strips 70-110 are cured together), the layer 50 need not include a haven portion 52 (see FIG. 8). If the layer 40 is cured together with the rest, then the layer 50 may need to include a haven portion 52 to prevent conductive ink leaking (see FIG. 9). If the bus-bar harbored section 72 is oriented outward, rather than inward, the dielectric layer 50 can form haven walls 54-56 and the dielectric layer 40 can include a tail section 47 underlying the bus-bar section 71 (see FIG. 10).

Figure 11:
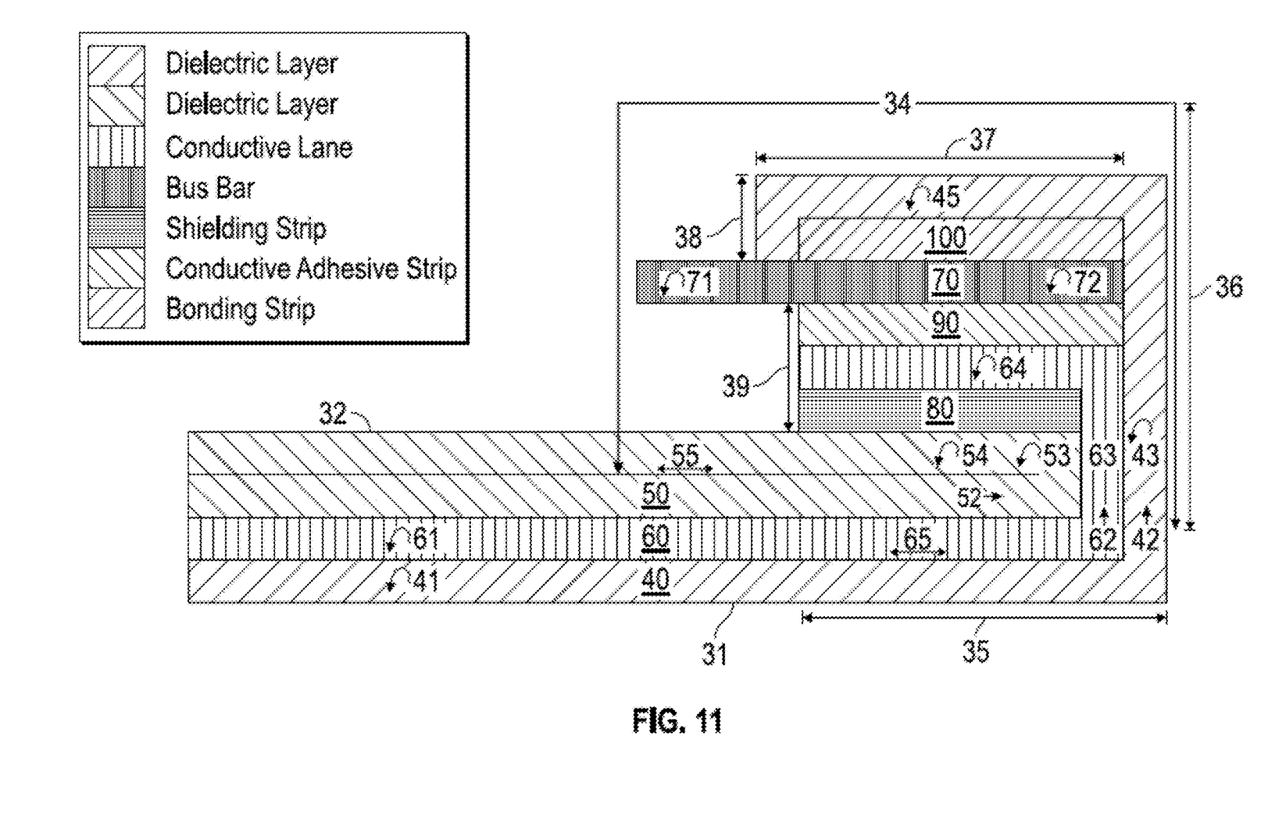

In a modified haven construction shown in FIG. 11, the "redundant" strip 110 and corresponding strips 120-150 are omitted. The harbored section 72 of the bus bar 70 can be secured directly to the haven roof 45 by the adhesive strip 100. This modification can be used when redundancy and/or reinforcement are not necessary.

Figure 12:
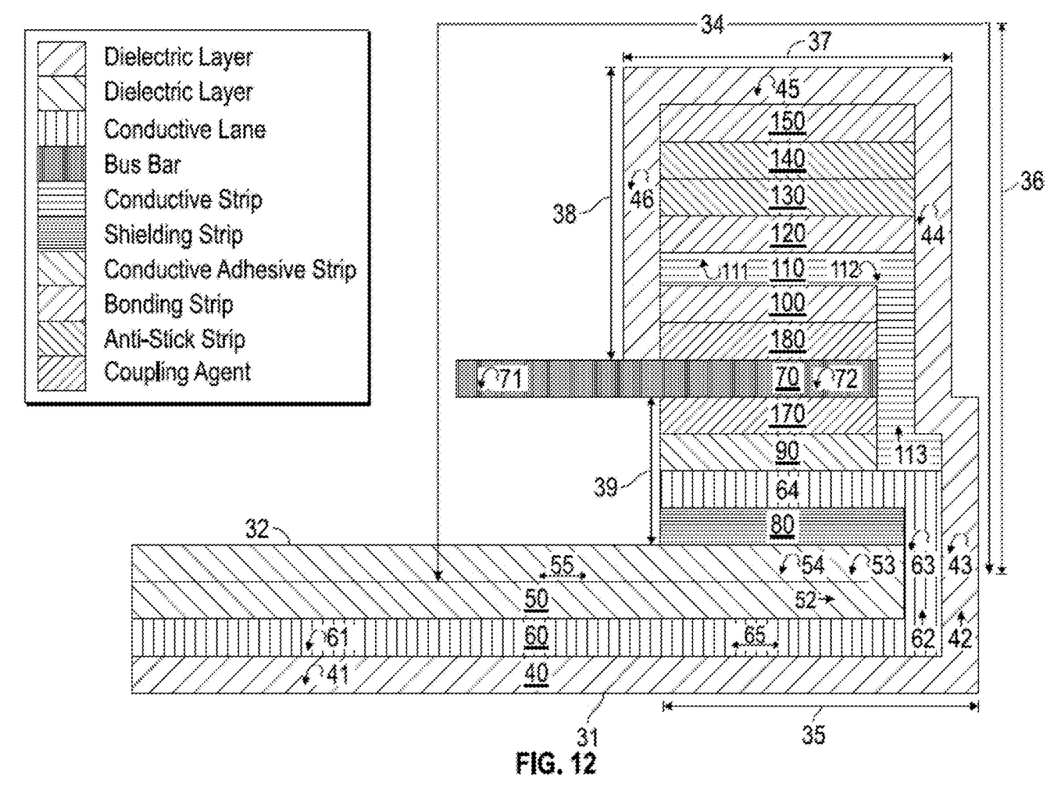

In the modified haven construction shown in FIG. 12, a coupling-agent 170 may be coated on the face of the bus bar 70 adjacent to the adhesive strip 90 and/or a coupling-agent 180 may be coated on the face of the bus bar 70 adjacent to the adhesive strip 100. The coupling agents 170/180 can comprise agents that promote and strengthen adhesion of the conductive adhesive 90/100 to the bus bar 70. A suitable coupling agent would be one that can react with the conductive resin in the adhesive and form a covalent bond. If, for example, the adhesive strip 90/100 is a silver-filled epoxy adhesive (e.g., Creative Materials 128-4A/B), the coupling agent 170/180 can contain NuSil Sp170 available from NuSil Silicone Technology.

Figure 13:
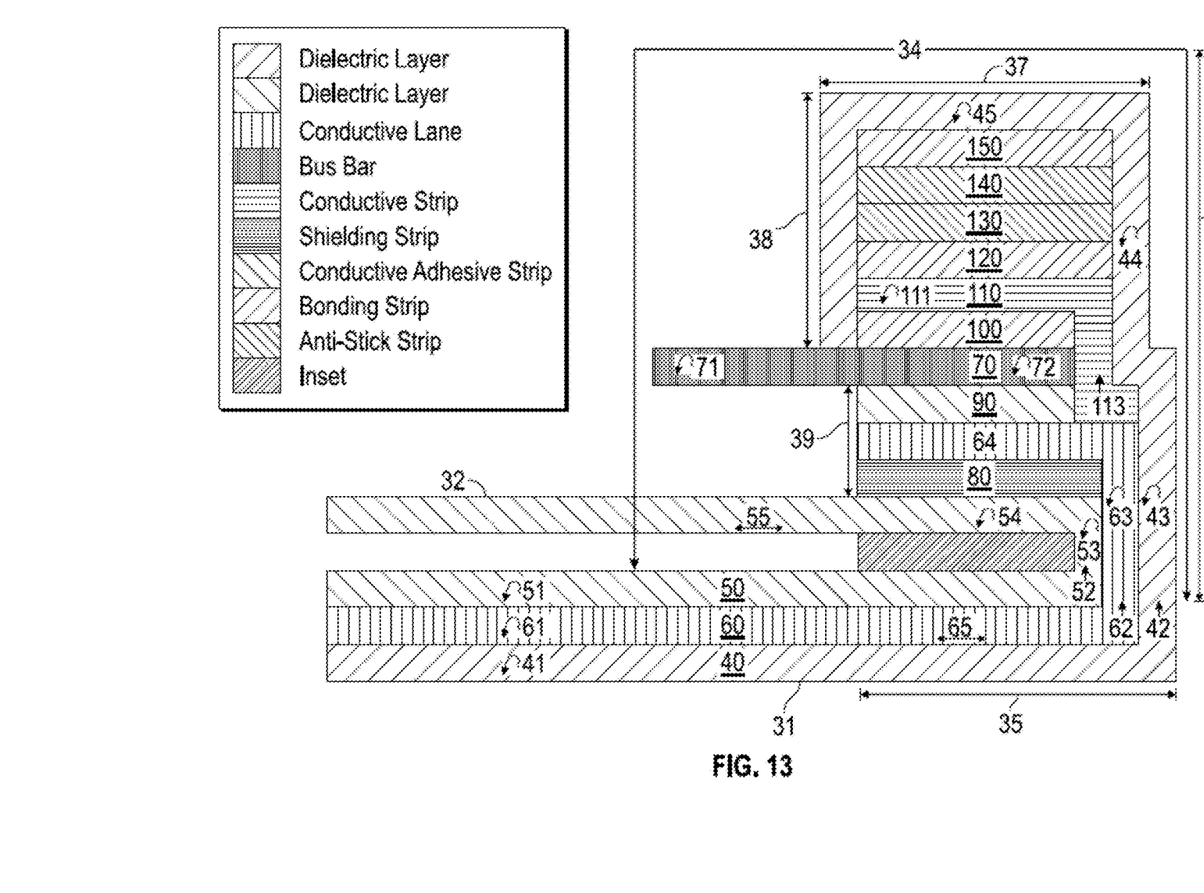

In the modified haven construction shown in FIG. 13, a protection inset 190 is included to further protect the bus bar 70 during perforation procedures. The inset 190 can be made of a high temperature elastomer such as silicone and/or fluorocarbon elastomers. The inset 190 can be used in addition to the shielding strip 80 (as shown) or as an alternative thereto. The inset 190 can be situated within the pocket formed by the conductive lane 60. More particularly, the inset 190 can be located in the bend of the dielectric layer 50 (e.g., between its ceiling section 54 and the underlying segment of its façade section 51). With this placement, the setting of the inset 190 is assured, even if it does not fully bond to the pocket.

Figure 14:
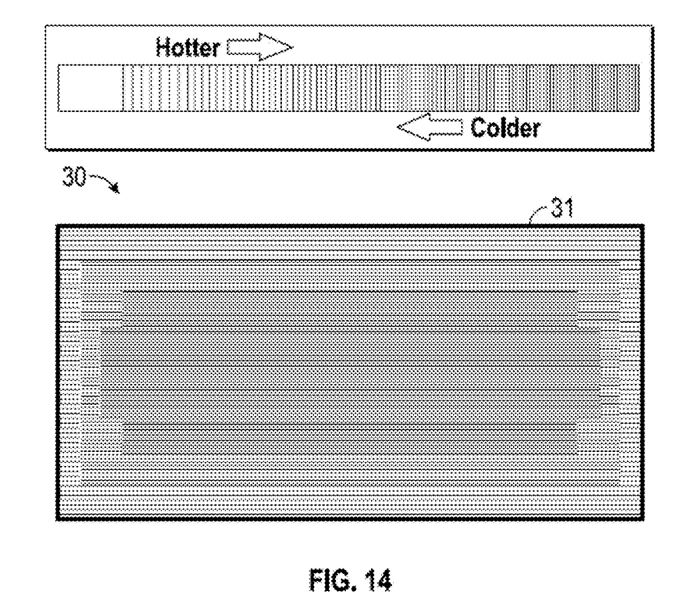
FIGS. 14-17 depict heat distribution patterns.
Figure 15:
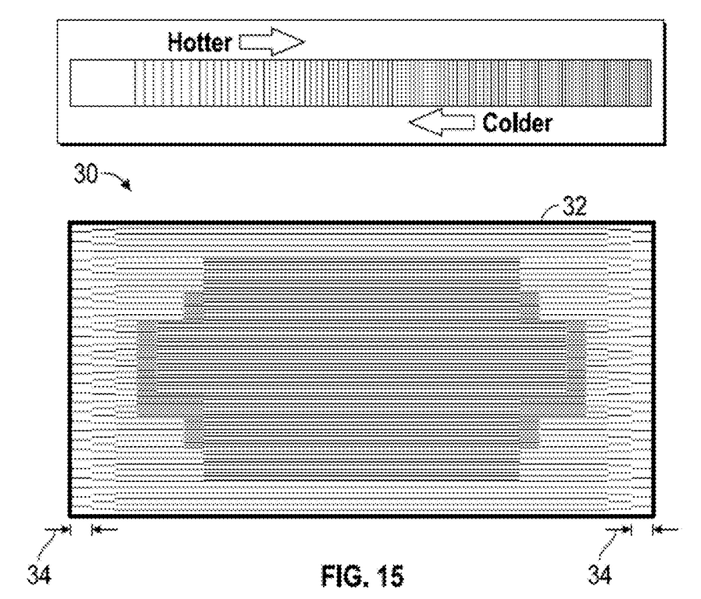

The heat distribution pattern for the heater 30 is shown in FIG. 14 and FIG. 15. Notably, excessively cold spots do not exist on the exterior surface 31 (i.e., the primary heating surface) in the regions overlying the havens 34. At the same time, cold spots do strategically occupy the havens 34 on the interior surface 32 where heat is not needed and may even be detrimental.

Figure 16:
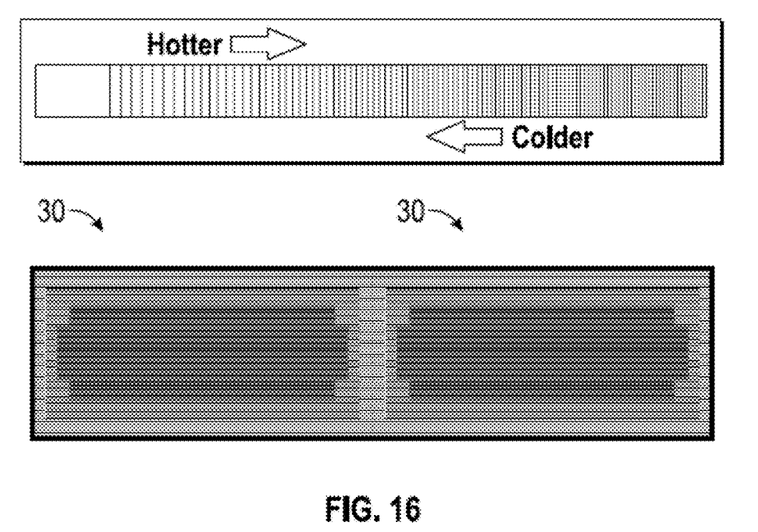
Figure 17:
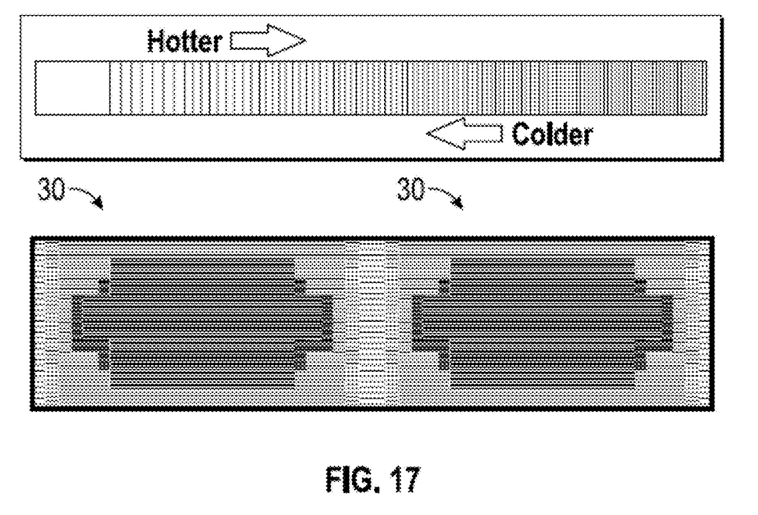

As was noted above, a plurality of heaters 30 can be laterally disposed edge-to-edge to service a larger aircraft area such as a nacelle lip or a wing. With such an arrangement, any overheating issues along the edges are compounded by the close-proximity of the neighboring heaters 30. As is shown in FIGS. 16 and 17, the haven construction does not result in overheated lateral edges in the heaters 30.

In the above cross-sectional drawings, the thickness of the layers, lanes, bars, and strips are greatly exaggerated. If such thicknesses were drawn to scale, it would be difficult to decipher and/or number the various stratums. And although corners and turns are represented as right angles, they are more likely to follow smooth curved paths resembling folds as oppose to perpendicular street intersections. Furthermore, although the drawings reflect approximately equal-thickness among the stratums, this would probably not be the case. For example, the conductive lanes 60 could be somewhat thicker (e.g., two to five times as thick) as the dielectric layers 40-50, the bus bar 70, and/or the adhesive strips 90-100.

One may now appreciate that the havens 34 shelter vulnerable interfaces, mitigate cold spots on the primary heating surface 31, shield sensitive junctions during soldering steps, and accommodate perforation procedures, guard against adhesive migration during manufacture, offer electrical-connection redundancy, reinforce delamination-prone region, secure conductive seams, and/or address thermal stress concerns.

Although the aircraft 10, the heating system 26, the heater 30, the platform 33, the haven 34, and/or the layers therein have been shown and described with respect to a certain embodiment or embodiments, it is obvious that equivalent alterations and modifications will occur to others skilled in the art upon the reading and understanding of this specification and the annexed drawings. By way of example, the heater 30 need not be used in an aircraft application, as it may be apt for use in other fields. Additionally or alternatively, the conductive lanes 60 need not comprise fabric, as the haven 34 may provides features helpful with other types of heating elements. And while certain features may have been described with respect to only one or some embodiments, each feature may be combined with one or more other features as may be desired and/or advantageous in a given situation.

The invention claimed is:

1. An electrothermal heater comprising:
a first dielectric layer;
a second dielectric layer;
one or more conductive lanes;
a pair of bus bars for each conductive lane; and
a set of strips for each bus bar,
wherein each of the dielectric layers and the one or more conductive lanes extend along the electrothermal heater from a first edge of the electrothermal heater to a second edge of the electrothermal heater, the first and second edges defining lateral edges of the electrothermal heater,
wherein the first dielectric layer has a first façade section,
wherein the second dielectric layer has a second façade section,
wherein each of the one or more conductive lane has a conductive façade section sandwiched between the first and second façade sections,
wherein the first, second, and conductive façade sections are configured to form a primary heating surface,
wherein each of the pair of bus bars has a first section adapted for electrical connection to a power source and a harbor section electrically connected to one of a plurality of lateral ends of one of the conductive lanes,
wherein each of the set of strips for each bus bar forms a haven having proximal walls and sheltering the harbor section of the bus bar, and wherein the first section of the bus bar adapted for electrical connection to a power source extends beyond the proximal walls of the haven.

2. An electrothermal heater as set forth in claim 1, wherein the one or more conductive lanes comprise an electrically conductive fabric.

3. An electrothermal heater as set forth in claim 2, wherein the electrically conductive fabric affords ohmic generation of heat by dint of an electrical resistance of the electrically conductive fabric.

4. An electrothermal heater as set forth in claim 1, wherein at least one of the first and second dielectric layers has a haven portion contributing to the formation of the haven.

5. An electrothermal heater as set forth in claim 1, wherein at least one of the first and second dielectric layers has a tail section positioned below one of the pair of bus bars, and
wherein the tail section is positioned outside of a pocket formed by the one or more conductive lanes.

6. An electrothermal heater as set forth in claim 1, wherein at least one of the one or more conductive lanes has a haven portion that contributes to formation of the haven.

7. An electrothermal heater as set forth in claim 6, wherein each of the conductive façade sections of each of the at least one of the one or more conductive lanes is formed as one piece with the haven portion.

8. An electrothermal heater as set forth in claim 1, wherein a section of one of the pair of bus bars is bonded to a ceiling of one of the first and second dielectric layers.

9. An electrothermal heater as set forth in claim 1, wherein each of the set of strips includes a shielding strip positioned between the first and second façade sections and one of the pair of bus bars corresponding to the haven.

10. An electrothermal heater as set forth in claim 1, wherein each of the set of strips includes an adhesive strip is configured to secure the one or more conductive lanes to one of the pair of bus bars corresponding to the haven, and
wherein the adhesive strip comprises an electrically conductive adhesive configured to withstand high temperatures and to tolerate a wide temperature range.

11. An electrothermal heater as set forth in claim 1, wherein each of the set of strips includes a strip configured to electrically connect a conductive strip to one the pair of bus bars.

12. An electrothermal heater as set forth in claim 1, wherein each of the set of strips includes a conductive strip configured to form a redundant electrical connection between one of the pair of bus bars and the one or more conductive lanes.

13. An electrothermal heater as set forth in claim 1, wherein each of the set of strips includes a conductive strip configured to reinforce a delamination-prone district.

14. An electrothermal heater as set forth in claim 1, wherein each of the set of strips includes at least two strips configured to slide relative to each other.

15. An electrothermal heater as set forth in claim 1, wherein each of the set of strips includes:
a first anti-stick strip secured to one the pair of bus bars; and
a second anti-stick strip secured to a roof of the haven, and
wherein the first and second anti-stick strips face each other, are not secured together, and are adapted to slide relative to each other.

16. An electrothermal heater as set forth in claim 1, wherein each of the set of strips includes a protection inset situated in a pocket formed by at least one of the one or more conductive lane.

17. An electrothermal heater as set forth in claim 1, wherein at least one of the first and second dielectric layers, the one or more conductive lanes, the pair of bus bars, and the set of strips are compiled and cured to form a composite structure.

18. The electrothermal heater of claim 1, wherein the first section adapted for electrical connection to the power source is exposed.

19. An electrothermal heater as set forth in claim 1, wherein
each of the one or more conductive lanes is configured to provide an electrical path between the first and second ends of the electrothermal heater.

20. An electrothermal heater as set forth in claim 1, wherein the first section adapted for electrical connection to the power source extends beyond proximal walls of the haven, and
wherein each of the set of strips includes at least two anti-stick strips configured to face each other and to form a sliding decoupling between one the pair of bus bars and the haven of that set of strips.

* * * * *